(12) United States Patent
Ota

(10) Patent No.: US 6,798,340 B2
(45) Date of Patent: Sep. 28, 2004

(54) COLLISION DETECTING APPARATUS FOR VEHICLE

(75) Inventor: Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/244,555

(22) Filed: Sep. 17, 2002

(65) Prior Publication Data

US 2003/0065431 A1 Apr. 3, 2003

(30) Foreign Application Priority Data

Sep. 18, 2001 (JP) ........................................ 2001-283693

(51) Int. Cl.⁷ ................................................. B60Q 1/00
(52) U.S. Cl. .................. 340/435; 340/436; 340/669; 340/511; 701/45; 180/274; 180/282
(58) Field of Search ............................... 340/435, 436, 340/669, 670, 671, 511; 701/45, 46, 47; 180/271, 274, 280, 282, 286

(56) References Cited

U.S. PATENT DOCUMENTS

| | | | | |
|---|---|---|---|---|
| 5,040,118 A | * | 8/1991 | Diller | 701/45 |
| 5,309,138 A | * | 5/1994 | Tohbaru | 340/436 |
| 5,317,512 A | * | 5/1994 | Ota et al. | 701/46 |
| 5,382,049 A | * | 1/1995 | Hiramitsu et al. | 280/735 |
| 5,555,174 A | * | 9/1996 | Okimoto et al. | 701/46 |
| 5,742,506 A | * | 4/1998 | Kura et al. | 701/301 |
| 6,104,973 A | | 8/2000 | Sugiyama et al. | 701/46 |
| 2001/0021890 A1 | | 9/2001 | Kanameda | 701/45 |

FOREIGN PATENT DOCUMENTS

| | | | | |
|---|---|---|---|---|
| DE | 196 16 836 A1 | 11/1997 | | B60R/21/32 |
| DE | 19616836 A1 | * 11/1997 | | B60R/21/32 |
| DE | 199 13 906 A1 | 10/1999 | | B60R/21/16 |
| DE | 199 41 506 A1 | 3/2000 | | B60R/21/01 |
| JP | 4-176757 a | 6/1992 | | |
| JP | 11-278342 A | 10/1999 | | |

OTHER PUBLICATIONS

Patent Abstracts of Japan, vol. 016, No. 484, Oct. 7, 1992 & JP 11 278342 A.

* cited by examiner

*Primary Examiner*—Jeffery Hofsass
*Assistant Examiner*—Jennifer A Stone
(74) *Attorney, Agent, or Firm*—Birch, Stewart, Kolasch & Birch, LLP

(57) ABSTRACT

To provide a collision detecting apparatus for a vehicle, including an integrating member for cumulatively integrating an output from an acceleration sensor when the output exceeds a specific calculation start level, and a collision detecting member for outputting a collision signal when a cumulative integral value calculated by the integrating member exceeds a threshold value, wherein the collision detecting apparatus is intended to accurately perform a collision decision by preventing the occurrence of an erroneous detection based on a vibration waveform of acceleration of the vehicle as a result of, for example, riding past a stepped portion. The collision detecting apparatus includes a vibration waveform detecting means W for detecting that an output waveform from the acceleration sensor S is a specific periodical vibration waveform. When the vibration waveform detecting member W detects the vibration waveform, the integrating member does not stop the cumulative integration even if the output G returns to a specific calculation end level $G_0$ and continues the cumulative integration for the output G that contains not only an output component corresponding to a negative acceleration but also an output component corresponding to a positive acceleration.

20 Claims, 4 Drawing Sheets

COLLISION DETECTING APPARATUS FOR VEHICLE

CROSS-REFERENCE TO RELATED APPLICATION

The present application claims priority under 35 USC 119 to Japanese Patent Application No. 2001-283693 filed on Sep. 18, 2001 the entire contents thereof is hereby incorporated by reference.

BACKGROUND OF THE INVENTION

1. Field of the Invention

The present invention relates to a collision detecting apparatus for a vehicle, which outputs a collision signal for starting a passenger protector for a vehicle, such as an air bag upon collision of the vehicle.

2. Description of Background Art

With respect to the collision detecting apparatus to which the present invention pertains, as described in Japanese Patent Laid-open No. Hei 4-176757, there is known a type including an integrating means for cumulatively integrating the output from an acceleration sensor when the output exceeds a specific calculation start level due to collision of the vehicle, wherein the collision detecting apparatus outputs a collision signal when a cumulative integral value calculated by the integrating means exceeds a specific threshold value.

The output from the acceleration sensor (detected acceleration) is rapidly changed upon collision of the vehicle. The output, however, may be sometimes periodically vary due a variety of causes other than collision during the operation of the vehicle. In this case, if the cumulative integral value of the output from the acceleration sensor exceeds the threshold value, a collision signal is uselessly outputted from the collision detecting means despite a collision of the vehicle, which requires the operation of a passenger protector, that does not occur.

For example, a motorcycle includes an acceleration sensor often mounted to a leading end portion of a front fork and its neighborhood as shown in FIG. 4 (see Japanese Patent Laid-open No. Hei 11-278342). When a front wheel rides past a stepped portion, a series of motions are applied to the leading end portion of the front fork. First, a large deceleration is applied thereto due to the contact between the front wheel and the stepped portion. Second, a large deceleration is applied thereto due to compression and bottoming of a suspension spring for the front wheel. Third, an excitation force in the vertical and longitudinal directions due to, for example, release of the compression of the suspension spring is applied thereto when the front wheel is moved upwardly. At last, a large deceleration is applied thereto when the front wheel is grounded. These series of motions cause, for example, a resonance of the front fork. As a result, the output waveform from the acceleration sensor sometimes becomes a periodical damped vibration waveform as shown in a graph of FIG. 4. The vibration waveform is characterized in that an amplitude of each of the second and later wave crests (2), (3)... becomes larger than that of the first wave crest (1).

According to the related art collision detecting apparatus, as the amplitude of the vibration waveform of the output from the acceleration sensor becomes large (particularly, in the order of the second and later wave crests), a cumulative integral value of the output from the acceleration sensor may sometimes exceed the threshold value. In this case, an erroneous collision decision may be made (that is, a collision signal is erroneously outputted) despite any collision of the vehicle that does not occur, to thereby uselessly start a passenger protector.

SUMMARY AND OBJECTS OF THE INVENTION

In view of the foregoing, the present invention has been made. It is an object of the present invention to provide a collision detecting apparatus for a vehicle, which is capable of preventing the occurrence of an erroneous detection due to a periodical vibration of acceleration due to a cause other than a collision of the vehicle, thereby accurately performing a collision decision.

To achieve the above object, according to the present invention a collision detecting apparatus for a vehicle is provided including an acceleration sensor for detecting an acceleration upon collision of the vehicle, integrating means for cumulatively integrating an output from the acceleration sensor when the output exceeds a specific calculation start level and stopping the cumulative integration when the output returns to a specific calculation end level. A collision detecting means is provided for outputting a collision signal when a cumulative integral value calculated by the integrating means exceeds a threshold value. The collision detecting apparatus includes a vibration waveform detecting means for detecting that an output waveform from the acceleration sensor is a specific periodical vibration waveform, wherein when the vibration waveform detecting means detects the vibration waveform. The integrating means does not stop the cumulative integration even if the output returns to the specific calculation end level and continues the cumulative integration for the output that contains not only an output component corresponding to a negative acceleration but also an output component corresponding to a positive acceleration.

With this configuration, upon collision of the vehicle, the integrating means starts the calculation when the output from the acceleration sensor exceeds a specific calculation level, and the collision detecting means outputs a collision signal when a cumulative integral value calculated by the integrating means exceeds a threshold value. If the vibration waveform detecting means does not detect any vibration waveform when the output from the acceleration sensor returns to a specific calculation end level in a state that the cumulative integral value does not exceed the threshold value, the cumulative integration is stopped.

When the output waveform from the acceleration sensor becomes a specific periodical vibration waveform as a result of a cause other than collision, for example, riding past a stepped portion, and the vibration waveform detecting means detects the vibration waveform. The integrating means does not stop the cumulative integration even if the output from the acceleration sensor returns to the calculation end level and continues the cumulative integration for the output that contains not only an output component corresponding to a negative acceleration but also an output component corresponding to a positive acceleration. Accordingly, in each cycle of the vibration waveform, the increase in cumulative integration can be made small as mush as possible by the effect of canceling the negative acceleration component (deceleration component) by the positive acceleration component. As a result the collision decision can be carefully made, to thereby prevent the collision detecting means from outputting an unnecessary collision signal due to the vibration waveform. This is advantageous in that even if a relatively large vibration of acceleration occurs as a result of, for example, riding past a stepped portion, the collision decision can be accurately made with a high responsiveness, thereby optimally controlling a starting time of the passenger protector on the basis of the collision decision.

According to the present invention, in the case of cumulatively integrating, on the basis of a detection of the vibration waveform, the output from the acceleration sensor contains not only an output component corresponding to a negative acceleration but also a positive acceleration. The integrating means clears the cumulative integral value each time the output is switched from a value corresponding to the negative acceleration to a value corresponding to the positive acceleration. With this configuration, since in each cycle of the vibration waveform, the increase in cumulative integral value can be effectively suppressed by the above-described cumulative integral value clearing effect, the collision decision is more carefully made, to thereby prevent the collision detecting means from outputting an unnecessary collision signal due to the vibration waveform.

According to the present invention, when the output from the acceleration sensor exceeds the calculation start level and then returns to the same level within a specific time, the vibration waveform detecting means decides that the output waveform is the vibration waveform and outputs a detection signal. With this configuration, the generation of a vibration of acceleration as a result of, for example, riding past a stepped portion can be simply, accurately detected.

According to the present invention, if after the output from the acceleration sensor exceeds the calculation start level and then returns to the same level, the output does not exceeds the same level again within a specific time, the integrating means clears the cumulative integral value at that time, and stops the cumulative integration. With this configuration, the convergence of a vibration of acceleration taken as a cause of continuing the cumulative integration even after the output from the acceleration sensor returns to the calculation end level or the dissipation of noise can be accurately detected, and since the cumulative integration is stopped after the convergence of the vibration of acceleration or the dissipation of noise is detected, the operation can be rapidly returned to the usual collision monitoring operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described in detail with reference to the accompanying drawings.

Figure 1:
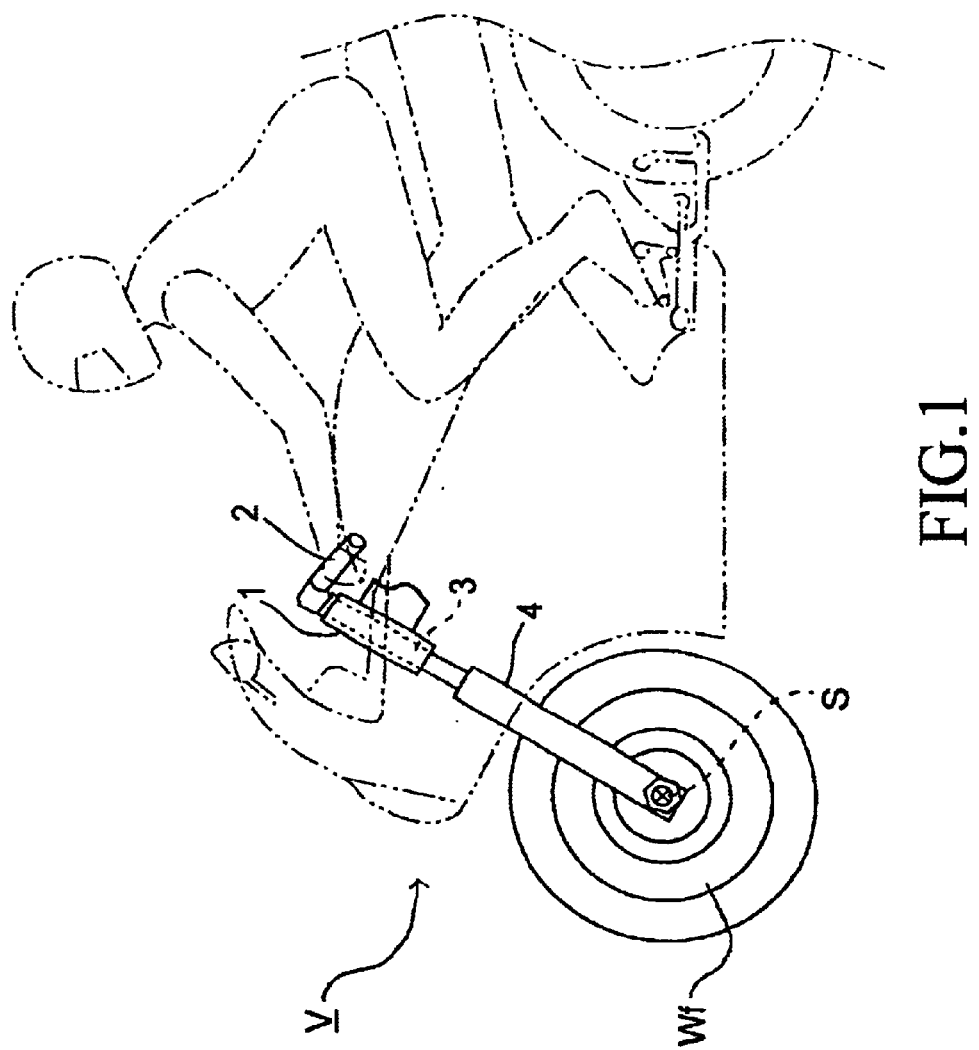
FIG. 1 is a schematic view showing the entire configuration of a motorcycle according to one embodiment of the present invention.

Referring first to FIG. 1, there is shown a motorcycle V representative of a vehicle to which the present invention is applied. A head pipe 1 is fixed to a front body of the motorcycle V, and a steering shaft 3 is turnably fitted to and supported by the head pipe 1. A steering handlebar 2 is connected to the upper end of the steering shaft 3, and a base end portion of a front fork 4 is fixed to the lower end of the steering shaft 3. A front wheel Wf is rotatably supported by a leading end portion of the front fork 4. An acceleration sensor S for detecting an acceleration applied to the vehicle when the motorcycle V collides is fixed to the leading end portion of the front fork 4 or in the vicinity thereof (front axle in the example shown in the figure). It is to be noted that the structure of mounting the sensor S to the front fork 4 is the same as a known structure described, for example, in Japanese Patent Laid-open No. Hei 11-278342, and the description thereof is omitted.

Figure 3:
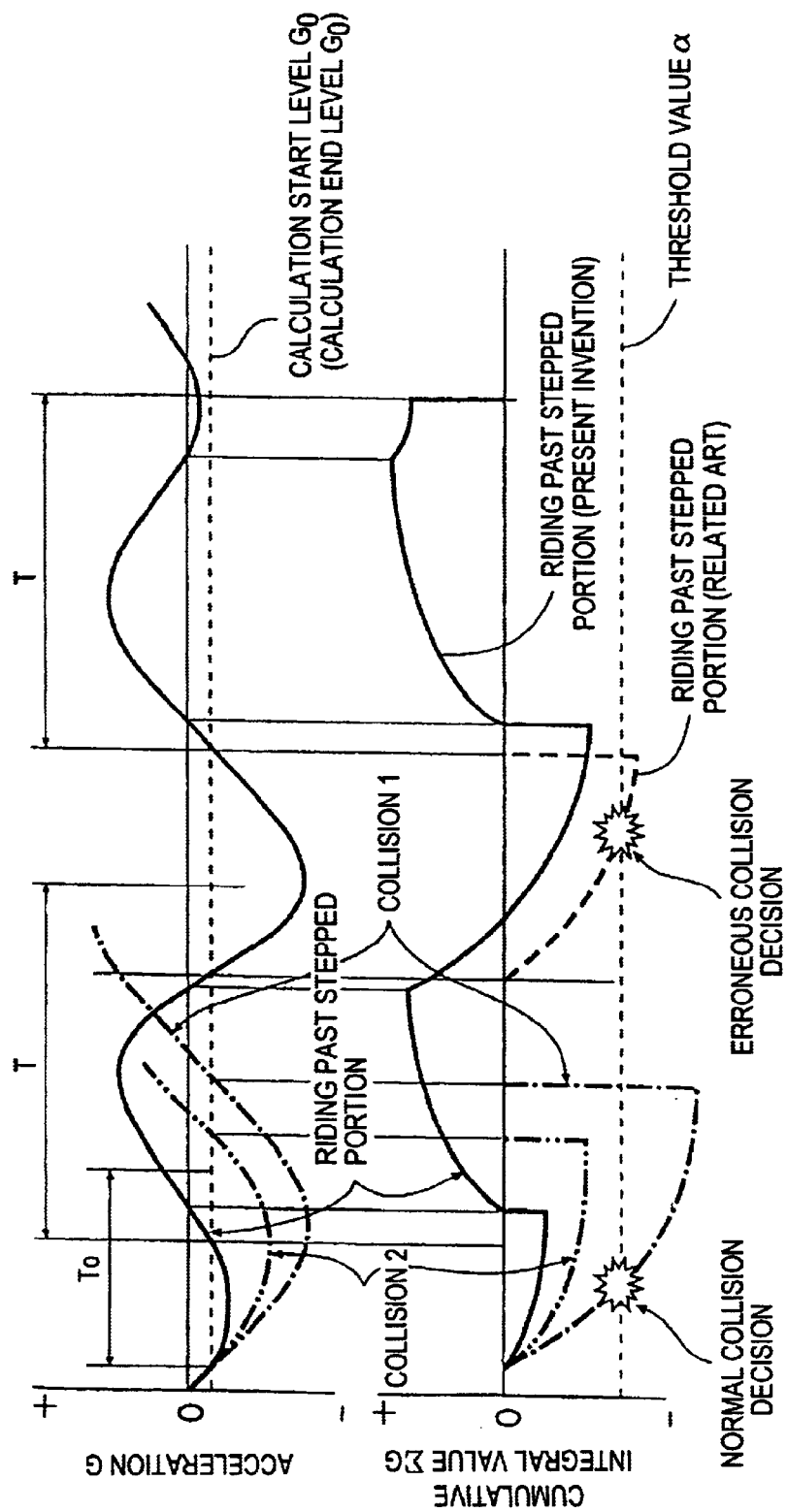
FIG. 3 is a timing chart showing a change state of each of an acceleration and a cumulative acceleration after collision.
Figure 4:
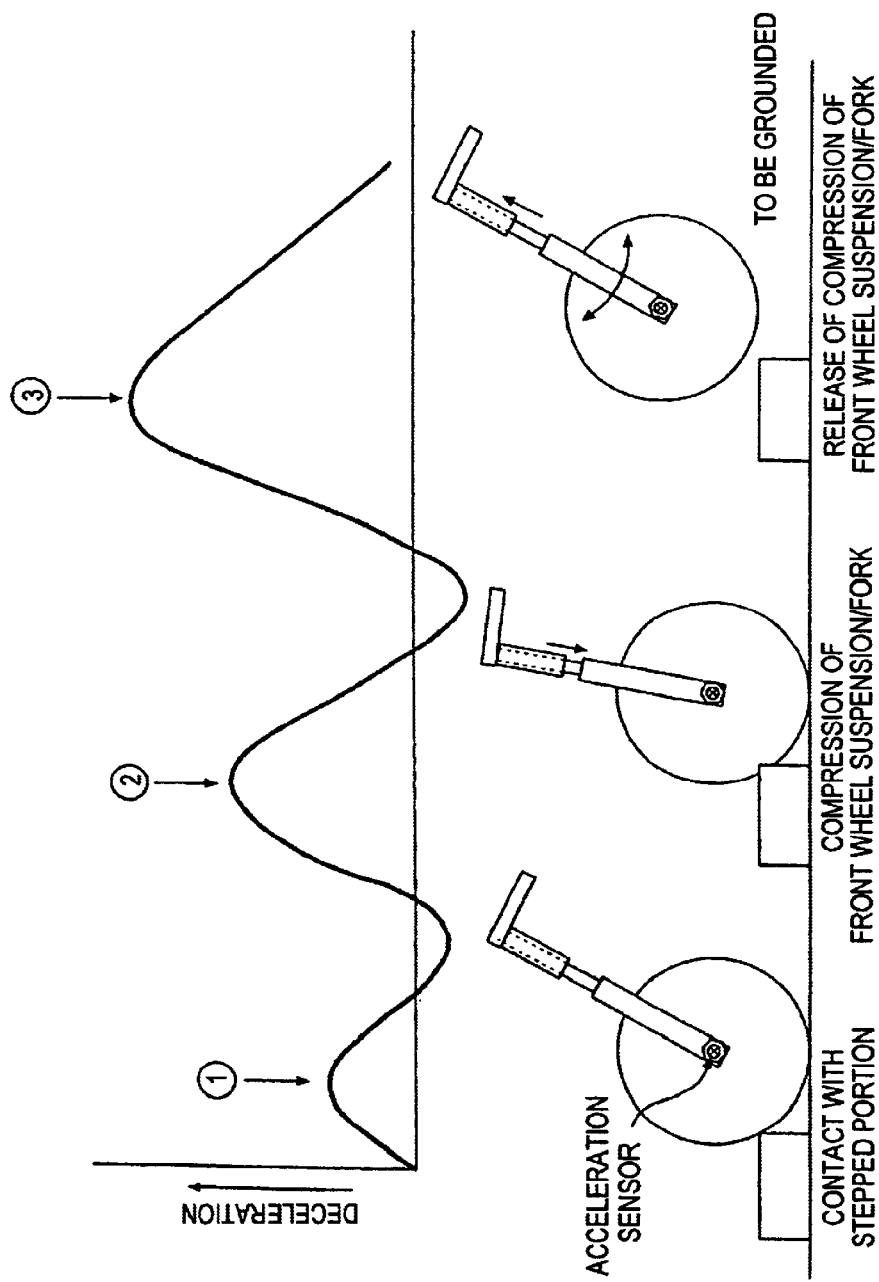
FIG. 4 is a diagram showing a vibration waveform of acceleration caused when the motorcycle rides past a stepped portion, and also illustrating the generation principle of the vibration waveform of the acceleration.

An output G (for example, an output voltage) of the acceleration sensor S corresponds to a value of an acceleration to be detected. A positive (+) value of the output G means a positive acceleration, and a negative (−) value of the output G means a negative acceleration (that is, a deceleration). Immediately after collision of the vehicle, as shown in FIG. 3, a negative output G indicating a deceleration outputted from the acceleration sensor S is changed so as to be raised on the negative side (lower than zero of the graph of FIG. 3).

Figure 2:
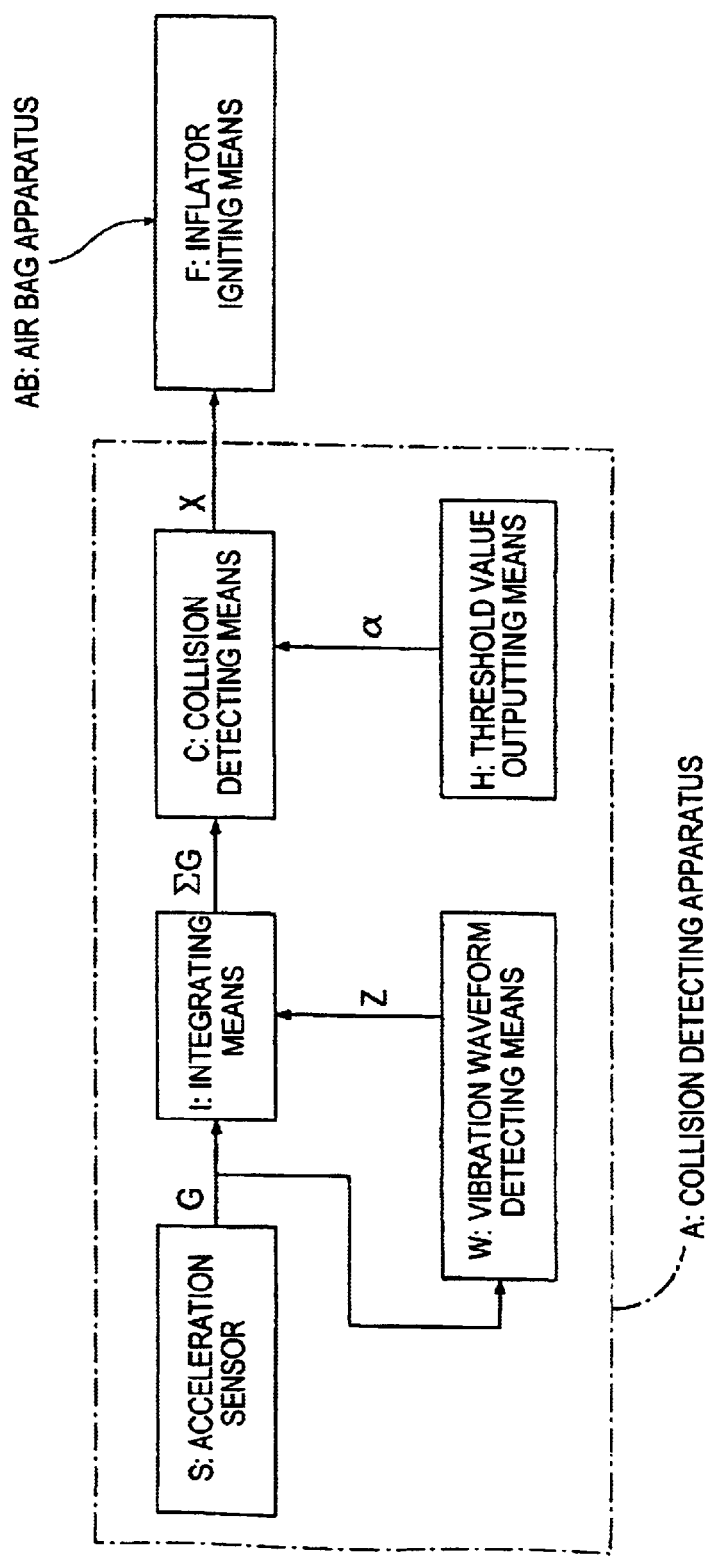
FIG. 2 is a control block diagram according to the present invention.

An air bag apparatus AB (FIG. 2) as a passenger protector is disposed at an appropriate position of the front body of the motorcycle V. Like a known air bag apparatus, the apparatus AB includes an inflator igniting means F, an inflator (not shown) ignited by starting the ignition means F, and an air bag (not shown) that is expanded by a gas blown from the inflator so as to protect a passenger. The inflator igniting means F starts in response to a collision signal X outputted from a collision detecting apparatus A (to be described later) upon collision of the vehicle, to ignite the inflator.

The collision detecting apparatus A includes the above-described acceleration sensor S, an integrating means I, a collision detecting means C, and a threshold value outputting means H. The integrating means I is adapted for cumulatively integrating the output G from the acceleration sensor S when the output G exceeds a specific calculation start level $G_0$. The collision detecting means C is adapted for outputting a collision signal when a cumulative integral value $\Sigma G$ calculated by the integrating means I exceeds a threshold value $\alpha$. The threshold value outputting means H is adapted for outputting the threshold value $\alpha$ used in calculation for collision decision to the collision detecting means C. According to this embodiment, the collision detecting apparatus A further includes a vibration waveform detecting means W for detecting that an output waveform from the acceleration sensor S is a specific periodical vibration waveform as a result of, for example, riding past a stepped portion.

Most of the components, except the acceleration sensor S, of the collision detecting apparatus A can be controlled by an electronically-controlled unit such as a micro-computer provided at an appropriate position of the vehicular body. The threshold value a outputted from the threshold value outputting means H to the collision detection means C may be set to a constant value, or may be set to a value variable depending on a collision state.

As is apparent from FIG. 3, in a state immediately after a collision of the vehicle, since a negative acceleration, that is, a deceleration is applied to the vehicle, the output G from the acceleration sensor S is negative, so that the output differential value dG/dt and the cumulative integral value $\Sigma G$ become negative, and correspondingly, the calculation start level $G_0$ and the threshold value $\alpha$ are set to negative values.

If the output G from the acceleration sensor S exceeds the calculation start level $G_0$ on the negative side (lower than zero in the graph of FIG. 3) and then returns to the same level $G_0$ rapidly (concretely, within a specific time $T_0$) as a result of, for example, riding past a stepped portion, the vibration waveform detecting means W decides that the output waveform is not an output waveform caused by collision but is a vibration waveform caused by, for example, riding past a stepped portion, and outputs a detection signal Z to the integrating means I.

The integrating means I starts, as described above, the cumulative integration when the output G from the acceleration sensor S exceeds the specific calculation start level $G_0$. If after start of the calculation, the output G of the acceleration sensor S returns to a specific calculation end level $G_0$ in a state that the cumulative integral value $\Sigma G$ does not exceeds the threshold value a on the negative side even after an elapse of the specific time $T_0$ (in this case, not any detection signal is outputted from the vibration waveform detecting means W), the integrating means I resets the cumulative integral value $\Sigma G$ and stops the cumulative integration. It is to be noted that in the example shown in the figure, the calculation end level $G_0$ at which the cumulative integration is stopped is set to be the same as the calculation start level $G_0$; however, according to the present invention, the calculation end level $G_0$ may be set to be different from the calculation start level $G_0$.

If an output waveform from the acceleration sensor S becomes a specific periodical vibration waveform as a result of a cause other than a collision, for example, riding past a stepped portion, and the vibration waveform detecting means W detects such a vibration waveform, the integrating means I receives the detection signal Z from the vibration waveform detecting means W. In this case, even if the output G from the acceleration sensor S returns to the calculation end level $G_0$, the integrating means I does not stop the cumulative integration but continues the cumulative integration (cycle integration) for the output G that contains not only an output component corresponding to a negative acceleration but also an output component corresponding to a positive acceleration. Further, according to this embodiment, in this cycle integration, each time the output G from the acceleration sensor S is switched from a negative value to a positive value in the example shown in the figure, the cumulative integral value $\Sigma G$ until then is cleared (that is, reset to zero).

If after the output G from the acceleration sensor S exceeds the calculation start level $G_0$ and returns to the same level $G_0$, the output G does not exceed again the same level $G_0$ within a specific time T, the integrating means I clears the cumulative integral value $\Sigma G$ at that time and stops the cumulative integration, to be thereby in a state switchable to a usual integrating operation at any time.

The function of this embodiment will be described below. Upon collision of the vehicle, the acceleration sensor S is operated. When the output G from the acceleration sensor S exceeds the specific calculation start level $G_0$, the integrating means I starts the cumulative integration of the output G. When the cumulative integral value $\Sigma G$ calculated by the integrating means I exceeds the usual threshold value $\alpha$ on the negative side (lower than zero in the graph of FIG. 3), the collision detecting means C outputs the collision signal X to the inflator igniting means F (see a chain line of collision I in FIG. 3). As a result, the inflator starts to rapidly generate a gas to abruptly expand the air bag, thereby protecting a passenger from the impact caused by the collision of the vehicle.

If the vibration waveform detecting means W does not detect any vibration waveform, that is, does not output the detection signal Z when the output G from the acceleration sensor S returns, after start of the cumulative integration by the integrating means I, to the calculation end level $G_0$ in a state that the cumulative integral value $\Sigma G$ does not exceeds the threshold value $\alpha$, the cumulative integration is stopped (see a chain line of collision 2 in FIG. 3).

If during operation of the vehicle, the output waveform from the acceleration sensor S becomes the specific periodical vibration waveform as a result of a cause other than a collision, for example, riding past a stepped portion, the integrating means I executes the above-described cycle integration in response to the detection signal Z outputted from the vibration waveform detecting means W to the integrating means I. In this case, during cycle integration, each time the output G from the acceleration sensor S is switched from a negative value to a positive value, the cumulative integral value $\Sigma G$ until then is cleared.

Accordingly, when a periodical vibration of acceleration occurs as a result of, for example, riding past a stepped portion, in each cycle of the vibration waveform, the increase in cumulative integral value $\Sigma G$ can be effectively suppressed by a combination of the effect of a canceling a negative acceleration component by a positive acceleration component and the effect of clearing the cumulative integral value $\Sigma G$. As a result, the collision decision can be carefully made, to thereby prevent the collision detecting means from outputting an unnecessary collision signal X due to the vibration waveform. This is advantageous in that even if a relatively large vibration of an acceleration occurs due to a cause other than a collision, the collision decision can be accurately made with a high responsiveness, thereby optimally controlling a starting time of the air bag apparatus AB.

According to this embodiment, when the output G from the acceleration sensor S returns, after the output G exceeds the calculation start level $G_0$, to the same level $G_0$ within the specific time $T_0$, the vibration waveform detecting means W decides that the output waveform is the vibration waveform, and outputs the detection signal Z. Accordingly, the generation of a vibration of acceleration as a result of, for example, riding past a stepped portion can be simply, accurately detected while being distinguished from the generation of a usual collision.

When the output G from the acceleration sensor S does not exceeds, after the output G exceeds the calculation start level $G_0$ and then returns to the same level $G_0$, the same level $G_0$ again within the specific time T (that is, in the case where the convergence of the vibration of acceleration taken as a cause for executing the cycle integration or the dissipation of noise is detected), the cumulative integral value ΣG at that time is cleared and the cumulative integration is stopped, to be thus rapidly returned to the usual operation (that is, usual collision monitoring operation by the collision detecting apparatus A).

While the embodiment of the present invention has been described in detail, the present invention is not limited thereto, and it is to be understood that various changes in design may be made without departing from the scope of the present invention.

In the embodiment, the vehicle to which the present invention is applied is configured as a motorcycle liable to cause a rigid collision; however, since even a four-wheeled vehicle may possibly cause a rigid collision depending on an operating state of the vehicle, the present invention is applicable to a four-wheeled vehicle.

As described above, according to the present invention, when the output waveform from the acceleration sensor becomes the specific periodical vibration waveform as a result of a cause other than a collision, for example, riding past a stepped portion, and the vibration waveform detecting means detects the vibration waveform, the integrating means does not stop the cumulative integration even if the output from the acceleration sensor returns to the calculation end level and continues the cumulative integration for the output that contains not only an output component corresponding to a negative acceleration but also an output component corresponding to a positive acceleration. Accordingly, in each cycle of the vibration waveform, the increase in cumulative integration can be made small as much as possible by the effect of canceling the negative acceleration component (deceleration component) by the positive acceleration component, with a result that the collision decision can be carefully made, to thereby prevent the collision detecting means from outputting an unnecessary collision signal due to the vibration waveform. This is advantageous in that even if a relatively large vibration of acceleration occurs as a result of, for example, riding past a stepped portion, the collision decision can be accurately made, thereby optimally controlling a starting time of the passenger protector.

According to the present invention, in the case where the integrating means performs, on the basis of a detection of the vibration waveform, the cumulative integration for the output from the acceleration sensor, which output contains not only an output component depending on a negative acceleration but also an output component corresponding to a positive acceleration, each time the output is switched from a value corresponding to the negative acceleration to a value corresponding to the positive acceleration, the cumulative integral value is cleared. As a result, in each cycle of the vibration waveform, the increase in cumulative integral value can be effectively suppressed and thereby the collision decision can be more carefully performed.

According to the present invention, the generation of a vibration of acceleration as a result of, for example, riding past a stepped portion can be simply, accurately detected.

According to the present invention, the convergence or the like of a vibration of acceleration taken as a cause of continuing the cumulative integration even after the output from the acceleration sensor returns to the calculation end level can be accurately detected and then the cumulative integration is stopped. As a result, after the above cause is eliminated, the operation can be rapidly returned to the usual collision monitoring operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collision detecting apparatus for a vehicle comprising:

an acceleration sensor (S) for detecting an acceleration upon collision of said vehicle;

integrating means (I) for cumulatively integrating an output (G) from said acceleration sensor (S) when the output (G) exceeds a specific calculation start level ($G_0$) and stopping the cumulative integration when the output (G) returns to a specific calculation end level ($G_0$); and collision detecting means (C) for outputting a collision signal (X) when a cumulative integral value (ΣG) calculated by said integrating means (I) exceeds a threshold value (α);

said collision detecting apparatus comprising:

vibration waveform detecting means (W) for detecting that an output waveform from said acceleration sensor (S) is a specific periodical vibration waveform;

wherein when said vibration waveform detecting means (W) detects the vibration waveform, said integrating means (I) does not stop the cumulative integration even if the output (G) returns to said specific calculation end level ($G_0$) and continues the cumulative integration for the output (G) that contains not only an output component corresponding to a negative acceleration but also an output component corresponding to a positive acceleration.

2. The collision detecting apparatus for a vehicle according to claim 1, wherein in the case of cumulatively integrating, on the basis of detection of the vibration waveform, the output (G) from said acceleration sensor (S), said output (G) containing not only an output component corresponding to a negative acceleration but also a positive acceleration, said integrating means (I) clears the cumulative integral value (ΣG) each time the output (G) is switched from a value corresponding to the negative acceleration to a value corresponding to the positive acceleration.

3. The collision detecting apparatus according to claim 1, wherein when the output (G) from said acceleration sensor (S) exceeds the calculation start level ($G_0$) and then returns to the same level ($G_0$) within a specific time ($T_0$), the vibration waveform detecting means (W) decides that the output waveform is the vibration waveform and outputs a detection signal (Z).

4. The collision detecting apparatus according to claim 2, wherein when the output (G) from said acceleration sensor (S) exceeds the calculation start level ($G_0$) and then returns to the same level ($G_0$) within a specific time ($T_0$), the vibration waveform detecting means (W) decides that the output waveform is the vibration waveform and outputs a detection signal (Z).

5. The collision detecting apparatus for a vehicle according to claim 3, wherein if after the output from said acceleration sensor (S) exceeds the calculation start level ($G_0$) and then returns to the same level ($G_0$), and the output does not exceed the same level ($G_0$) again within a specific time (T), the integrating means (I) clears the cumulative integral value (ΣG) at that time, and stops the cumulative integration.

6. The collision detecting apparatus for a vehicle according to claim 4, wherein if after the output from said acceleration sensor (S) exceeds the calculation start level ($G_0$) and then returns to the same level ($G_0$), and the output does not exceed the same level ($G_0$) again within a specific time (T), the integrating means (I) clears the cumulative integral value ($\Sigma G$) at that time, and stops the cumulative integration.

7. The collision detecting apparatus for a vehicle according to claim 1, wherein the threshold value ($\alpha$) is a predetermined constant value.

8. The collision detecting apparatus for a vehicle according to claim 1, wherein the threshold value ($\alpha$) is a variable value depending on a collision state.

9. The collision detecting apparatus according to claim 1, wherein when the output (G) from said acceleration sensor (S) exceeds the calculation start level ($G_0$) and then returns to a predetermined level distinct from the start level ($G_0$) within a specific time ($T_0$), the cumulative integration is stopped.

10. The collision detecting apparatus according to claim 2, wherein when the output (G) from said acceleration sensor (S) exceeds the calculation start level ($G_0$) and then returns to a predetermined level distinct from the start level ($G_0$) within a specific time ($T_0$), the cumulative integration is stopped.

11. A collision detecting apparatus for a vehicle comprising:
  an acceleration sensor (S) for detecting an acceleration upon collision of said vehicle;
  integrating means (I) for cumulatively integrating an output (G) from said acceleration sensor (S) when the output (G) exceeds a specific calculation start level ($G_0$) and stopping the cumulative integration when the output (G) returns to a specific calculation end level ($G_0$);
  collision detecting means (C) for outputting a collision signal (X) when a cumulative integral value ($\Sigma G$) calculated by said integrating means (I) exceeds a threshold value ($\alpha$);
  vibration waveform detecting means (W) for detecting that an output waveform from said acceleration sensor (S) is a specific periodical vibration waveform;
  wherein when said vibration waveform detecting means (W) detects the vibration waveform, said integrating means (I) is stopped when the cumulative integration when output (G) returns to said specific calculation end level ($G_0$) and when a cumulative integral value ($\Sigma G$) calculated by said integrating means (I) does not exceed a threshold value ($\alpha$) on a negative side.

12. The collision detecting apparatus for a vehicle according to claim 11, wherein in the case of cumulatively integrating, on the basis of detection of the vibration waveform, the output (G) from said acceleration sensor (S), said output (G) containing not only an output component corresponding to a negative acceleration but also a positive acceleration, said integrating means (I) clears the cumulative integral value ($\Sigma G$) each time the output (G) is switched from a value corresponding to the negative acceleration to a value corresponding to the positive acceleration.

13. The collision detecting apparatus according to claim 11, wherein when the output (G) from said acceleration sensor (S) exceeds the calculation start level ($G_0$) and then returns to the same level ($G_0$) within a specific time ($T_0$), the vibration waveform detecting means (W) decides that the output waveform is the vibration waveform and outputs a detection signal (Z).

14. The collision detecting apparatus according to claim 12, wherein when the output (G) from said acceleration sensor (S) exceeds the calculation start level ($G_0$) and then returns to the same level ($G_0$) within a specific time ($T_0$), the vibration waveform detecting means (W) decides that the output waveform is the vibration waveform and outputs a detection signal (Z).

15. The collision detecting apparatus for a vehicle according to claim 13, wherein if after the output from said acceleration sensor (S) exceeds the calculation start level ($G_0$) and then returns to the same level ($G_0$), and the output does not exceed the same level ($G_0$) again within a specific time (T), the integrating means (I) clears the cumulative integral value ($\Sigma G$) at that time, and stops the cumulative integration.

16. The collision detecting apparatus for a vehicle according to claim 14, wherein if after the output from said acceleration sensor (S) exceeds the calculation start level ($G_0$) and then returns to the same level ($G_0$), and the output does not exceed the same level ($G_0$) again within a specific time (T), the integrating means (I) clears the cumulative integral value ($\Sigma G$) at that time, and stops the cumulative integration.

17. The collision detecting apparatus for a vehicle according to claim 11, wherein the threshold value ($\alpha$) is a predetermined constant value.

18. The collision detecting apparatus for a vehicle according to claim 11, wherein the threshold value ($\alpha$) is a variable value depending on a collision state.

19. The collision detecting apparatus according to claim 11, wherein when the output (G) from said acceleration sensor (S) exceeds the calculation start level ($G_0$) and then returns to a predetermined level distinct from the start level ($G_0$) within a specific time ($T_0$), the cumulative integration is stopped.

20. The collision detecting apparatus according to claim 12, wherein when the output (G) from said acceleration sensor (S) exceeds the calculation start level ($G_0$) and then returns to a predetermined level distinct from the start level ($G_0$) within a specific time ($T_0$), the cumulative integration is stopped.

* * * * *